United States Patent Office 3,606,939
Patented Sept. 21, 1971

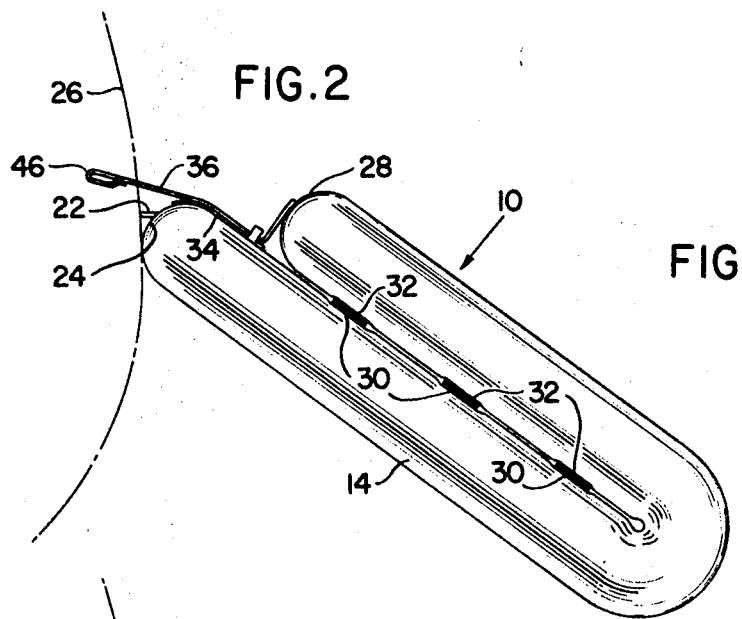
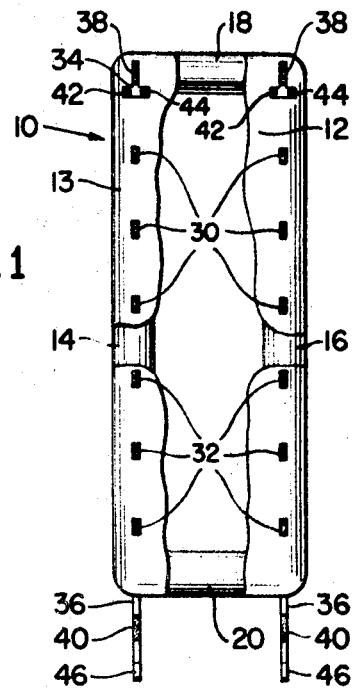
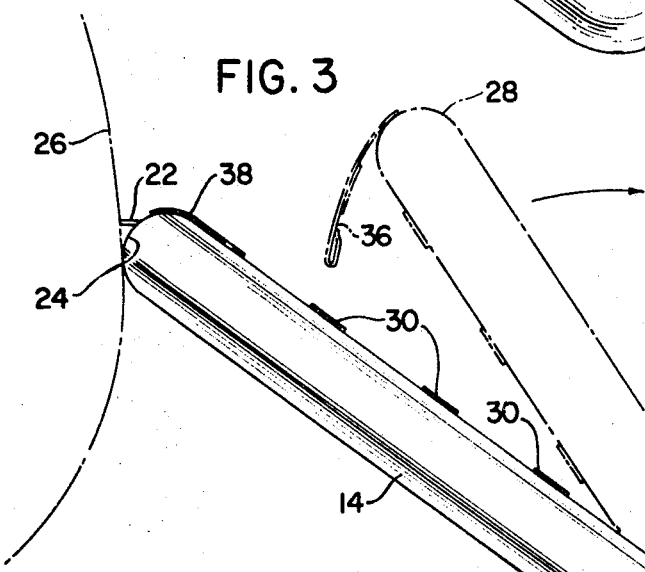
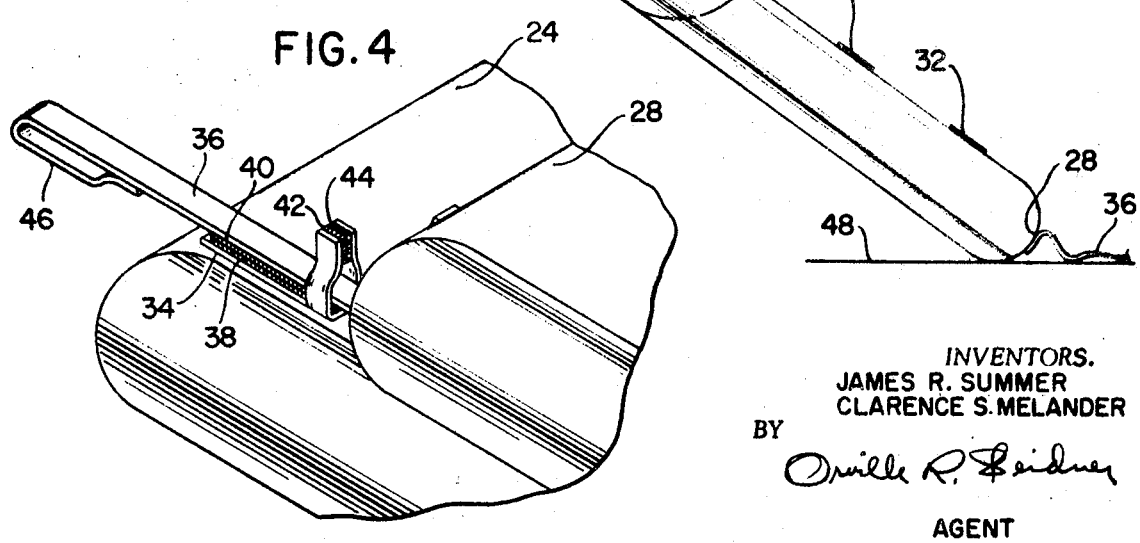
INVENTORS.
JAMES R. SUMMER
CLARENCE S. MELANDER
AGENT

3,606,939
INFLATABLE ESCAPE SLIDE
James R. Summer, Brielle, and Clarence S. Melander,
Neptune, N.J., assignors to The Garrett Corporation,
Los Angeles, Calif.
Filed Mar. 6, 1969, Ser. No. 804,867
Int. Cl. B65g 11/10
U.S. Cl. 193—25                               7 Claims

ABSTRACT OF THE DISCLOSURE

The lower half of the length of an inflatable escape slide is doubled back over and onto the top of the upper half and restrained thereat by hook and pile fasteners which are secured during an initial slide inflation stage until the beam members of the slide are nearly fully shaped, and which are then released to permit the lower half to swing upwardly, outwardly and then downwardly to rest, thus preventing tuck-under during inflation of the slide in a cross wind.

BACKGROUND OF THE INVENTION

This invention relates in general to inflatable apparatus, and is concerned more particularly with an inflatable escape slide for emergency evacuation from a grounded aircraft. Specifically, the invention is directed to an arrangement of the slide with restraint means providing the securing of portions of the slide adjacent other portions during an initial stage of inflation, and thereafter the restraint is removed permitting full deployment and inflation of the slide to full pressure. The arrangement is efficacious in achieving substantial inflation of the slide members to near-ultimate shape before the entire slide is deployed, thus presenting a minimum of slide surface to any cross wind present which might cause the partially inflated slide to swing under the aircraft and thereafter become fully inflated in a useless position.

It has been discovered that when an uniflated slide is erupted from its container to hang from the escape door hatchway, the small interval of time lapse between that eruption and the full inflation of the slide is oftentimes disastrous, if there is any amount of cross wind blowing. The net result has been, on occasion, a tuck-under of the slide beneath the aircraft rather than extending outwardly at an angle from the doorway. It is obvious that this condition defeats absolutely the basic purpose for which the slide was originally intended.

SUMMARY OF THE INVENTION

The present invention overcomes the problem of tuck-under by a fastening of slide portions together during an initial inflation stage, yet permitting near-ultimate inflation of the fluid distensible members while presenting only about one-half of the slide surface to the wind. The invention provides for the release of the slide portions, one from the other, only after near complete shaping of the members is accomplished by inflation whereafter the lower half of the slide (which was restrained against the upper half) is caused to swing upwardly, outwardly, and then downwardly and thereby effectively defeat any tuck-under tendency in the presence of a cross wind.

The restraint of the lower slide portion against the upper portion is best accomplished, according to the present invention, by the judicious placement and use of hook and pile fasteners which withstand the initial shear stresses developed during the initial inflation stage and thereafter release easily under the stripping or peel forces developed after the fluid distensible members have been nearly completely shaped by the inflation.

BRIEF DESCRIPTION OF THE DRAWING

FIG. 1 is a plan view, schematic in nature of an inflatable slide embodying the invention;

FIG. 2 is a side elevation view of the slide of FIG. 1 as it would appear after the initial inflation period was about complete, but before the subsequent inflation period causes separation of the restraining fasteners;

FIG. 3 is a side elevation view of the slide of FIG. 2, as it would appear after the fasteners had separated, with subsequent deployment of the slide end to the ground plane; and FIG. 4 is a perspective schematic of an enlarged portion of the upper end of the slide illustrated in FIG. 2, showing the supplementary fastener detent structure.

DESCRIPTION OF THE PREFERRED EMBODIMENT

Referring to FIG. 1, the slide apparatus 10, shown in its fully inflated condition, comprises a slideway sheet 12 disposed over a substantially rectangular tubular frame 13 formed of the flexible wall, fluid distensible elongate beam members 14 and 16 and the end members 18 and 20. The sheet 12 is illustrated as partly broken away to show the members 14, 16, 18 and 20. The structural details of the beam members 14 and 16 and the end members 18 and 20, as well as the sheet 12 and its attachment thereto, are old and well-known in the art and hence require no further detailed description herein.

In FIGS. 2 and 3 the apparatus 10 is shown as having a girt 22 arranged to secure the upper end 24 of the slide adjacent an egress hatchway (not shown) in a structure designated only schematically by the dot-dash line 26. The structure may be, for example, a passenger aircraft having the apparatus 10 stowed in a container (not shown) in uninflated condition. Upon the occurrence of a condition necessitating the escape of the passengers by way of the slide apparatus 10, the container opens to permit eruption and inflation of the apparatus 10 to proceed apace whereby the slide apparatus 10 deploys quickly from the structure in two stages. In the initial stage of inflation, the inflating fluid which is usually bottled and/or aspirated air furnished by apparatus well-known in the art hence not shown and described herein, quickly fills the frame 13 to cause the beam and end members 14, 16, 18 and 20 to take near-ultimate shape with a small internal positive pressure. This is the inflation stage shown in FIG. 2, and it will be seen that the apparatus 10 is doubled back upon itself with the lower end 28 disposed adjacent the upper end 24. The girt 22 tends to cause the apparatus 10 to extend outwardly at an angle after the initial stage of inflation is substantailly complete. The doubled-back configuration shown in FIG. 2 presents approximately only one-half the frontal area to any cross wind which may be blowing, hence the apparatus 10 is less apt to tuck back under the fuselage of the aircraft then or during the subsequent inflation and thus defeat its purpose.

The doubled-back configuration of FIG. 2 is achieved by restraint devices comprised of fastener means which secure one portion of the wall, for example, of beam members 14 and 16 adjacent another portion of the wall. As shown in the figures, fastener means 30 and 32 are disposed at spaced intervals along the top surface of the apparatus 10 and preferably on or immediately above the beam members 14 and 16. Fastener means 30 are cooperable with means 32, and to this end it is preferred that means 30, for example, may be of the pile variety while means 32 may be of the hook variety. Fastener means of this type are well-known under the trademark Velcro. As is well-known, Velcro fasteners are strong in shear and less resistant to forces which cause stripping or peel.

The apparatus 10 is also provided, preferably, with fastener means 34 and 36 secured adjacent the upper and lower ends 24 and 28, respectively, of the apparatus. Again, as was the case with fasteners 30 and 32, the fastener means 34 and 36 are preferably of the pile and hook variety. The fastener 34 is of T-shaped configuration having a pile element 38 co-operable with a hook element 40 on the fastener 36. The fastener 34 also has a small pile element 42 co-operable with a small hook element 44 to comprise a supplementary fastener detention means which provides a nominal resistance to initiation of the disengagement of the means 36 from the means 34. Thus, as shown in FIG. 4, when the hook and pile elements 38 and 40 are engaged, the pile and hook elements 42 and 44 envelop the fastener means 36 and are engaged thereabove so as to resist the initial peel force exerted by the end 28 on the fastener means 36. The fastener means 36 is provided with a looped portion 46 which serves as a handle for manual disengagement of the means 36 from the fastener means 34, if desired.

As shown in FIG. 3, in full lines, the apparatus 10 has its upper end 24 disposed against the elevated structure, schematically designated by the dot-dash line 26, and its lower end 28 disposed adjacent the ground plane, designated by the reference numeral 48.

FIG. 3 also shows by dot-dash lines the swing upwardly, outwardly and then downwardly of the lower end 28 of the slide upon disengagement of the various fastener means. The swing of the lower end from the restrained to unrestrained position eliminates any substantial possibility of the slide apparatus 10 from tuck-under due to cross wind forces. Disengagement of the hook and pile fastener elements occurs after the initial stage of inflation, i.e. upon an increase of pressure within the beam members above the small pressure necessary to distend the beam member walls to the tubular configuration. The hook and pile elements in effect sense the shape and pressure of the beam members, and when the stripping or peeling force exceeds that which holds the fastener elements together, the hook and pile elements are separated to permit the lower slide end to swing upwardly, outwardly, and then downwardly as aforesaid.

It should be noted that when the slide apparatus begins to take shape during the initial inflation stage, the supplementary hook and pile fastener detention elements 42 and 44 are loaded in shear, hence an increased positive pressure is necessary to cause them to separate and permit the hook and pile elements 38 and 40 to disengage. Subsequent to this shear and peel of elements 42, 44 and 38, 40, the elements 30 and 32 will peel and permit deployment of the slide. It will also be noted that the hook and pile elements 30 and 32 provide an added feature in that they hold the slide body together and prevent distortion by wind forces and help guide the lower slide portion so that it snaps out straight rather than to one side.

We claim:
1. Inflatable and deployable apparatus, comprising:
  a flexible wall, fluid distensible member of generally elongate configuration when fully inflated and deployed, and having one end secured against movement;
  a plurality of longitudinally spaced first fastener means disposed on one portion of the wall of said member; and
  a plurality of longitudinally spaced second fastener means co-operable with said first means and disposed on another portion of the wall of said member,
    said first and second means being arranged so as to secure said wall portions adjacent each other during an initial period of inflation of said member, and thereafter in a subsequent period of continued inflation to disengage and permit said portions to move apart and thus permit said member to deploy into its generally elongate fully inflated configuration extending away from its said fixed one end,
    said first and second means being comprised of hook and pile fastener elements which tend to resist shear strains imparted thereto by the wall of said member during said initial period of inflation, and which peel readily from each other during said subsequent period of inflation,
    said first and second fastener means are arranged so as to disengage progressively during said subsequent period of inflation, said apparatus comprising fastener detention means providing a nominal measure of resistance to initiation of the progressive disengagement of said first and second fastener means.

2. The apparatus of claim 1 in which said detention means comprises supplementary hook and pile fastener elements which are co-operatively engaged during said initial period of inflation of said member and which are disengaged after said initial inflation period but prior to any substantial disengagement of said first and second fastener means.

3. Inflatable escape slide apparatus for evacuation from an elevated egress hatchway to a lower ground plane, comprising:
  a flexible wall, fluid distensible member of generally elongate configuration when fully inflated and deployed, and having one end secured adjacent said hatchway and the other end adjacent said ground plane;
  a plurality of longitudinally spaced first fastener means disposed on one portion of the wall of said member; and
  a plurality of longitudinally spaced second fastener means co-operable with said first means and disposed on another portion of the wall of said member,
    said first and second means being arranged so as to secure said wall portions adjacent each other during an initial period of inflation of said member, and thereafter in a subsequent period of continued inflation to disengage and permit said portions to move apart and thus permit said member to deploy into its generally elongate fully inflated configuration extending away from its said fixed one end,
    said first and second fastener means being comprised of hook and pile fastener elements which tend to resist shear strains imparted thereto by the wall of said member during said initial period of inflation, and which peel readily from each other during said subsequent period of inflation,
    said first and second fastener means are arranged so as to disengage progressively during said subsequent period of inflation, said apparatus comprising fastener detention means providing a nominal measure of resistance to initiation of the progressive disengagement of said first and second fastener means.

4. The apparatus of claim 3 in which said one end of said member is arranged to be secured adjacent an egress hatchway elevated above a ground plane, the other end of said member being arranged for disposition adjacent said ground plane when said member is fully inflated.

5. The apparatus of claim 3 in which said detention means comprises supplementary hook and pile fastener elements which are co-operatively engaged during said initial period of inflation of said member and which are disengaged after said initial inflation period but prior to any substantial disengagement of said first and second fastener means.

6. Inflatable escape slide apparatus for evacuation from an elevated egress hatchway of an aircraft to a ground plane upon which the aircraft is at rest, comprising:
  a pair of flexible wall, fluid distensible members which, upon inflation, are of generally elongate configuration, and spaced apart with one end of each secured adjacent the egress hatchway of the aircraft and the other end disposed adjacent said ground plane;

sheet means secured to said members and extending substantially between and from end to end thereof to form an escape slide surface upon inflation of said apparatus;

a plurality of longitudinally spaced first fastener means disposed adjacent said one end of each of said members; and a plurality of longitudinally spaced second fastener means co-operable with said first means and disposed adjacent said other end of said members, said first and second fastener means being arranged so as to secure said other end of each of said members adjacent the respective said one end of each of said members during an initial period of inflation of said members, and thereafter in a subsequent period of continued inflation to disengage and permit said other end to move away from said one end of each of said members and thus permit said members to deploy into their generally elongate fully inflated configuration to form an escape slide from the egress hatchway of said aircraft to the ground plane, said first and second fastener means are comprised of hook and pile fastener elements which tend to resist shear strains imparted thereto by the walls of said members during said initial period of inflation, and which peel readily from each other during said subsequent period of inflation, said first and second fastener means are arranged so as to disengage progressively during said subsequent period of inflation, said apparatus comprising fastener detention means providing a nominal measure of resistance to initiation of the progressive disengagement of said first and second fastener means.

7. The apparatus of claim 6 in which said detention means comprises supplementary hook and pile fastener elements which are co-operatively engaged during said initial period of inflation of said members and which are disengaged after said initial inflation period but prior to any substantial disengagement of said first and second fastener means.

References Cited
UNITED STATES PATENTS

| | | | |
|---|---|---|---|
| 3,018,867 | 1/1962 | Heyniger | 193—25 |
| 3,063,749 | 11/1962 | Struble et al. | 161—53UX |
| 3,391,771 | 7/1968 | Day | 193—25 |
| 3,463,287 | 8/1969 | Smith | 193—25 |
| 3,463,266 | 8/1969 | Day | 193—25 |
| 3,465,991 | 9/1969 | Banas et al. | 193—25 |
| 3,506,225 | 4/1970 | Snyder | 244—149 |

HARVEY C. HORNSBY, Primary Examiner

M. F. MAFFEI, Assistant Examiner

U.S. Cl. X.R.

128—Digest 15; 244—137